United States Patent [19]

Buch

[11] Patent Number: 5,274,509
[45] Date of Patent: Dec. 28, 1993

[54] ON-THE-FLY SPLITTING OF DISK DATA BLOCKS USING TIMED SAMPLING OF A DATA POSITION INDICATOR

[75] Inventor: Bruce D. Buch, Westborough, Mass.

[73] Assignee: Digital Equipment Corporation, Maynard, Mass.

[21] Appl. No.: 943,252

[22] Filed: Sep. 10, 1992

[51] Int. Cl.$^5$ .............................................. G11B 5/09
[52] U.S. Cl. ........................................ 360/48; 360/51
[58] Field of Search ................ 360/48, 51, 77.08, 135, 360/77.04, 27, 31, 46, 53, 39, 50, 31; 364/900; 369/54, 59

[56] References Cited

U.S. PATENT DOCUMENTS

| | | | |
|---|---|---|---|
| 4,241,420 | 12/1980 | Fish et al. ............................ | 364/900 |
| 4,366,512 | 12/1982 | Janak et al. ............................ | 360/48 |
| 4,424,543 | 1/1984 | Lewis et al. ............................ | 360/135 |
| 4,734,901 | 3/1988 | Murakami ........................ | 360/48 X |
| 4,811,280 | 3/1989 | Berkowitz et al. ................ | 360/48 X |
| 4,858,034 | 8/1989 | Hassel et al. ............................ | 360/51 |
| 4,949,200 | 8/1990 | Weng .................................. | 360/48 X |
| 5,073,834 | 12/1991 | Best et al. ............................. | 360/77.08 |
| 5,150,262 | 9/1992 | Kosokawa et al. ................... | 360/48 |
| 5,230,067 | 7/1993 | Buch ....................................... | 395/275 |

OTHER PUBLICATIONS

P. J. Badum, On-The-Fly Inter Record Gap Formation, vol. 11, No. 8, Jan. 1969, IBM Technical Disclosure Bulletin.
Kirk, Christianson, and Faizullabhoy, "Embedded Intelligence", BYTE vol. 17, No. 3, Mar. 1992, pp. 195-203.

Primary Examiner—Donald Hajec
Assistant Examiner—Patrick Wamsley
Attorney, Agent, or Firm—Albert P. Cefalo; Ronald C. Hudgens; James F. Thompson

[57] ABSTRACT

A disk in a disk drive has radial spokes wherein servo bursts are recorded, and multiple concentric bands holding data blocks in pre-defined block frames. To maximize data density, the data rate in each band is proportional to the band radius, and the ratio of block frames to spokes in a given band may be non-integral. In such bands, some data blocks are split by a spoke. A disk controller in the disk drive uses a byte position accumulator (BPA) when splitting a data block. During the transfer of a data block, the BPA counts at the nominal data transfer rate to continually identify by its position in the data block a byte therein to be transferred shortly. The BPA output feeds a latch which is normally open to receive the BPA output. A timer within the disk controller establishes the rotational time at which the data transfer must be suspended to avoid a spoke. The timer generates an early warning signal in advance of this time which closes the latch. The value in the closed latch is the position of the last data byte to be transferred before the split. A comparator indicates when a count of bytes transferred has reached the value in the latch; the data transfer is then suspended until the spoke has passed.

20 Claims, 4 Drawing Sheets

ON-THE-FLY SPLITTING OF DISK DATA BLOCKS USING TIMED SAMPLING OF A DATA POSITION INDICATOR

FIELD OF THE INVENTION

The invention relates to the field of disk storage devices having data blocks that are split by servo or other non-data information fields.

BACKGROUND OF THE INVENTION

In the field of disk storage, it is common practice to pre-record servo information upon a magnetic disk when the disk is manufactured. The servo information, which takes the form of signal "bursts", is recorded along with other information. It is normally recorded at regular angular intervals on the disk, and is not meant to be re-written during normal use. Therefore, in so-called embedded servo systems, wherein the same disk surface carries both servo information and user data, disk formatting techniques must accommodate radially-extending areas where user data cannot be stored.

One formatting technique allows disk data blocks to be placed such that they are split by such servo areas. This technique enables data blocks to be placed more freely than if they were constrained to be contiguous. Therefore, more blocks can be placed along many tracks on the disk, increasing storage density. This improvement does have a cost, however, because disk controllers used with such disks must be able to ignore the non-data portion while reading a block, and avoid it while writing.

Conceptually, a simple timing mark could indicate the times during the rotation of the disk that a split occurs. For example, if a disk rotates once every 16 milliseconds and there are 4 radially-extending servo areas, then splitting could occur (if necessary) at 4-millisecond intervals. However, due to spin speed variation and other effects, such an approach does not consistently yield the same byte position to split a given block during a read or write. Such a result is unacceptable from the standpoint of reliable data storage. Therefore, disk drives having split blocks generally have means for identifying the split location by byte position within each split block. This approach is more complicated than a simple timing system.

Disks having split blocks may also employ another density-improvement technique which unfortunately has the effect of increasing split-related complexity. It is known to arrange blocks of data in concentric bands or zones such as is illustrated in U.S. Pat. No. 4,858,034 issued Aug. 15, 1989 to Hassel et al. and entitled "Modular Unitary Disk File Subsystem With Differing Density Zones". Using that approach, data blocks along the inner track of a given zone are recorded near a maximum linear density obtainable with a given combination of media, head, and controller electronics. This approach increases complexity because the controller must account for differences between the zones. In particular, zones may have blocks split in different locations, so that just keeping track of split locations becomes a significant chore. Also, the number of such zones may be large if each zone is formatted to have only one more block than its inwardly-adjacent neighbor.

Currently, there are different techniques used to identify the split locations. One technique requires blocks to be split at predetermined locations, for example in the middle. A counter then determines when a predetermined number of bytes have been transferred to find the split location. While this approach is simple, it suffers from inflexibility: instead of forcing whole blocks to be contiguous, half-blocks are forced to be contiguous. Thus the placement of half-blocks is constrained, resulting in non-optimum storage density.

Other splitting techniques that improve flexibility generally require that the split locations be recorded somewhere, for example in a table in RAM or on the disk itself. Therefore, they are either more costly or complicated, or tend to reduce the very density gains they strive to achieve. For example, in one scheme the split location is recorded in a special "header" field appended to each disk block. This header field consumes disk area by making each block larger than otherwise necessary.

A simple, inexpensive block splitting technique is needed to maximize the storage density of disks using split-block formats.

SUMMARY OF THE INVENTION

The invention is an improved block-splitting method which can be practiced inexpensively in a disk controller. In contrast to prior methods which either rigidly fix the split location or consume expensive memory or disk area to record the split location, the invention is highly flexible and inexpensive to implement. These advantages arise at least partly from determining the split point of the fly rather than in advance, i.e., as the time for splitting approaches.

A simple timer within the disk controller establishes a time by which the data transfer (either read or write) must be suspended, as the disk rotates, to avoid writing over or reading non-data information. The timer generates an early warning signal shortly before that time. A special counter running concurrently with the data transfer continually identifies by its position in the data block a data unit, such as a byte, that is to be transferred shortly after being identified. When the early warning signal occurs, the then-identified data unit is designated to be the last data unit to be transferred before suspending the data transfer. When the designated last data unit has been transferred, the data transfer is suspended until the non-data portion of the disk has passed.

Since the timer and counter are mutually synchronous, the same data unit within a given data block is consistently designated as the last data unit to be transferred before splitting. A block state machine controlling the data transfer, whose operations are asynchronous with respect to the timer and counter, receives the position of the designated data unit before it actually reads or writes the designated data unit. It then suspends the data transfer until the non-data portion of the disk has passed, when it resumes the data transfer at the data unit following the designated data unit.

The invention eliminates the need for recording the split location in either a block header or RAM within the disk controller, and therefore allows higher-capacity, lower-cost disk drives to be designed. The invention can be practiced easily in a small area of a disk controller integrated circuit.

BRIEF DESCRIPTION OF THE DRAWING

An embodiment of the invention will be described with reference to the accompanying drawings, in which.

DESCRIPTION OF THE PREFERRED EMBODIMENT

Figure 1:
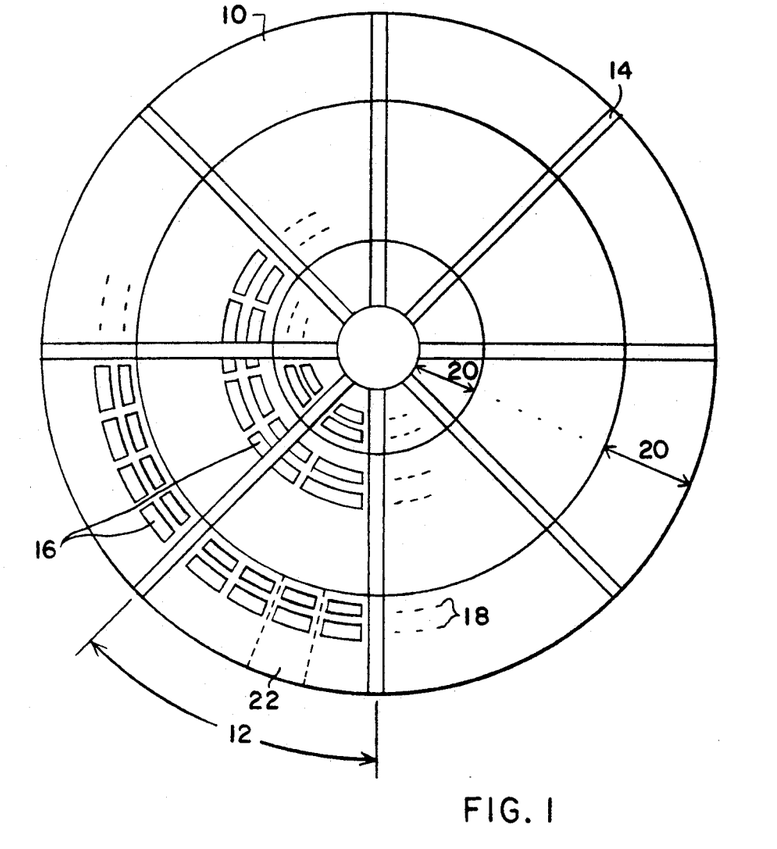
FIG. 1 is a schematic diagram showing the arrangement of data blocks and other features on a magnetic disk in a disk drive embodying the invention.

FIG. 1 illustrates the format of a magnetic disk 10 to be used in a disk drive embodying the present invention. The disk 10 is divided into sectors 12 by a number of radially-extending spokes 14 placed at regular angular intervals. The spokes 14 are areas on the disk containing servo bursts and sector identification information, as is described below with reference to FIG. 2a. The sectors 12 are areas on the disk containing data blocks 16 each having a fixed amount of data, for example 512 bytes.

As shown, the data blocks 16 occupy circular tracks 18 on the disk 10. The tracks 18 are grouped into bands 20. All of the tracks 18 in a given band 20 contain the same number of radially-aligned, data blocks 16. The section of a band 20 where a set of radially-aligned data blocks 16 is recorded is called a block frame 22. The beginning and end of a block frame 22 are defined by a timing system in a disk controller described below beginning with FIG. 3.

One skilled in the art will realize that the number of bands 20 is practically maximized if each band 20 has exactly one more block frame 22 than its inwardly-neighboring band 20. In that case, the number of bands 20 is simply the difference between the number of block frames 22 in the outermost band 20 and the number of block frames 22 in the innermost band 20. However, the principles of the invention are equally applicable to embodiments having any number of bands. The simplified embodiment of FIG. 1 has 3 bands 20.

The spokes 14 are numbered from 0 to 7 in the direction opposite to rotation; spoke 0 is chosen arbitrarily. The sectors 12 are also numbered from 0 to 7, each sector 12 being numbered the same as the immediately-preceding spoke 14. The block frames 22 in each band 20 are numbered starting from 0; block frame 0 in each band 20 is adjacent to spoke 0.

While the embodiment of FIG. 1 is shown having 8 spokes 14, the principles of the invention are equally applicable to embodiments having any number of spokes greater than 1. In fact, there may be embodiments wherein the number of spokes 14 is high enough, or the size of the data block 16 great enough, to require some data blocks 16 to be split in multiple places. The invention easily enables such multiple splitting.

In order to maximize storage capacity of the disk 10, the data blocks 16 along the innermost track 18 of each band 20 are recorded as close as possible to a predetermined maximum linear bit density, and the number of block frames 22 per band 20 increases with band radius. As a result, the data rate in megabytes per second (MB/s) in each band 20 also increases with radius. The number of tracks 18 is predetermined for a given disk 10; they are normally spaced as close as possible to maximize storage density. In the illustrated embodiment, the number of tracks 18 per band 20 varies from band 20 to band 20; it may be advantageous in other embodiments to have a constant number of tracks 18 per band 20.

In order to maximize storage density, the number of block frames 22 in each band 20 is not required to be an integral multiple of the number of sectors 12. Therefore, in some bands 20, some block frames 22 necessarily straddle a spoke 14. The data blocks 16 in those straddling block frames 22 are referred to as "split blocks". In practice, there is at least a minimum number of data bytes in either section of a split data block 16 for ease of starting and stopping the data transfer during operation. In the illustrated embodiment this minimum number is 4, so that a data pipeline (not shown) may be drained when a split is encountered. Other minimum numbers may advantageously be used in other embodiments.

Figure 2A:
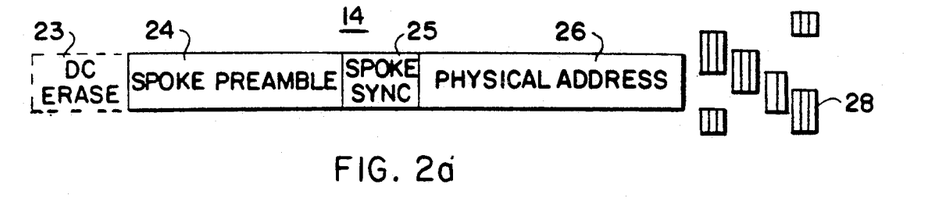
FIG. 2a illustrates the format of a spoke on the disk of FIG. 1.
Figure 2B:
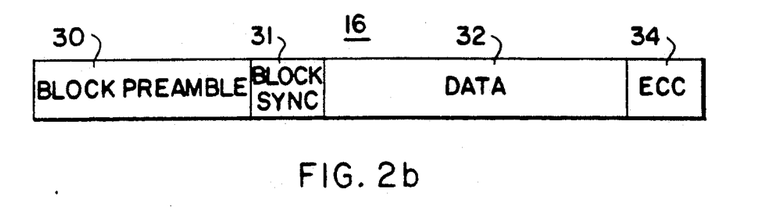
FIG. 2b illustrates the format of a data block on the disk of FIG. 1.

FIGS. 2a & 2b show respectively the formats of each spoke 14 and data block 16. Each spoke 14 contains a DC erase area 23, spoke preamble 24, spoke synchronization pattern 25, and an ID or physical address field 26. DC erase 23 is an area having no magnetic flux transitions, and is used to find the beginning of a spoke 14 after a head switch. The preamble 24 and spoke sync 25 are used in a conventional fashion to synchronize the disk drive timing system to the disk rotation; this synchronization will be further described beginning with FIG. 4 below. The ID field 26 contains numbers identifying the track, head, and sector. The spoke 14 also has conventional servo bursts 28 which give tracking information to a conventional servo controller in the disk drive as the disk 10 rotates.

The data block 16, like the spoke 14, also has a preamble 30 and synchronization pattern 31, as well as a data field 32 and ECC field 34. Significantly, the data block 16 does not contain an ID field; it is therefore referred to as a "headerless" block. Headerless blocks take up less space than blocks with headers, and thus contribute to increased storage density. Rather than being identified by the contents of an ID field, each data block 16 is identified by the block frame 22 and track 18 it occupies. It should be noted that the operation of the invention is not limited by either the presence or absence of data block headers.

Figure 3:
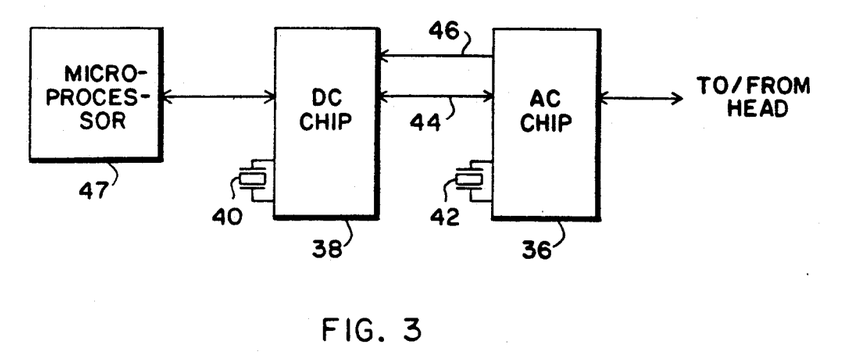
FIG. 3 is a simplified high-level block diagram of a disk controller that interacts with the disk of FIG. 1 during disk drive operation.

FIG. 3 shows a simplified high-level block diagram of a disk controller that works with the disk 10 of FIG. 1. An AC chip 36 interfaces to the disk head through a preamplifier (not shown) to read and write disk data. The AC chip 36 is a clock/data separator, and also performs other conventional functions unrelated to the present invention. The DC chip 38 performs higher-level control and data functions that will be described presently. A first crystal 40 generates a DC crystal clock to provide timing for the operation of the DC chip 38, while a second crystal 42 generates for the AC chip 36 an AC crystal clock serving as a timing reference for writes. The AC crystal clock is used by a conventional frequency synthesizer in the AC chip 36 to create the band-dependent write frequency. The AC chip 36 also contains conventional circuitry for deriving a timing reference from the data stream during reads.

While the illustrated clocks 40 and 42 are crystal clocks, other types of clocks may be advantageously used in other embodiments. Crystal clocks generate accurate timing references at a reasonable cost, and thus are particularly suitable.

Bidirectional data wires 44 transfer disk data between the AC chip 36 and the DC chip 38. The AC chip 36 also provides a data clock to the DC chip 38 on clock wire 46. The data clock on clock wire 46 is synchronous with the disk data appearing on the data wires 44 during both reads and writes, but is asynchronous with respect to the DC crystal clock generated by DC crystal 40.

Also shown in FIG. 3 is a microprocessor 47 capable of reading and writing registers within the DC chip 38 for control and monitoring purposes. The microprocessor 47 oversees operations of the disk controller such as seeking, band switching, and head switching. In particular, it programs various registers within the DC chip 38 with timing values and other information to enable the DC chip 38 to function correctly in each band 20. The microprocessor 47 maintains a table indicating which band 20 a particular track 18 occupies. Other operations of the microprocessor 47 that relate to the current invention are discussed with reference to following figures.

Figure 4:
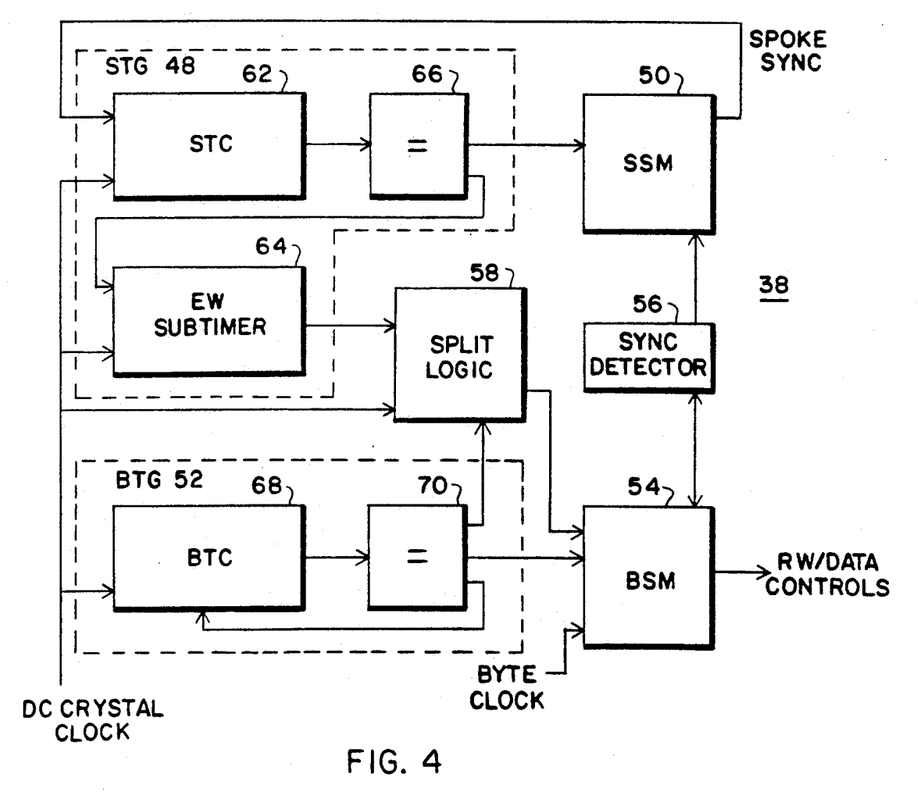
FIG. 4 is a block diagram of a portion of a controller chip in the disk controller of FIG. 3.

FIG. 4 shows components within the DC chip 38 that cooperate in the splitting of the data blocks 16 as the disk 10 rotates during operation. The major components are a sector timing generator or STG 48, spoke state machine or SSM 50, block timing generator or BTG 52, block state machine or BSM 54, sync detector 56, and split logic or SPL 58. The STG 48 further contains a sector timing counter or STC 62, early warning or EW subtimer 64, and a variety of conventional comparators 66 to detect specific values in the STC 62 and generate corresponding timing signals. Similarly, the BTG 52 contains a block timing counter or BTC 68 and comparators 70.

Figure 5:
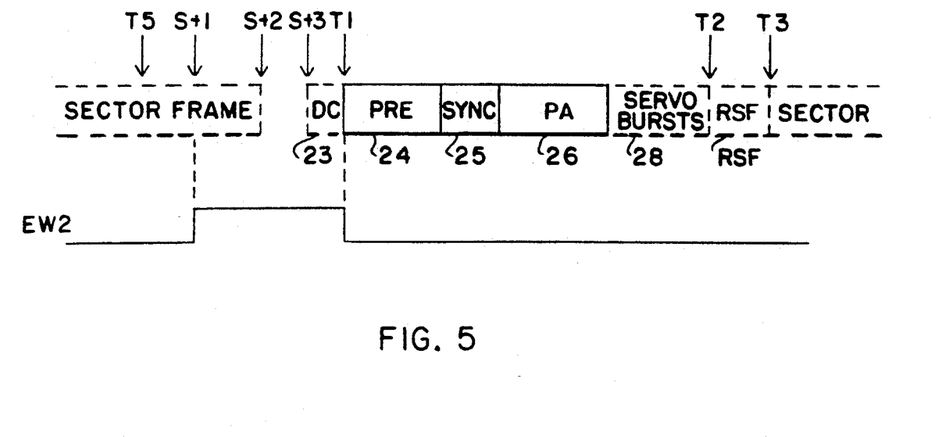
FIG. 5 is a timing diagram showing per-sector events in the controller chip of FIG. 4.

The STC 62 is a conventional binary counter clocked by the DC crystal clock. The STC 62 is reset to zero by a "spoke sync" signal generated by the SSM 50; therefore all timing signals generated by STG 48 during a sector interval are referenced to the time that synchronization was achieved during the preceding spoke 14. The per-sector timing events generated by the STG 48 are shown in FIG. 5. In FIG. 5, the events whose labels begin with "T" are generated by the comparators 66; those beginning with "st" are generated by the EW subtimer 64.

It should be noted that in the illustrated embodiment, spoke sync provides a convenient timing reference for the persector timing events shown in FIG. 5. Alternative embodiments may advantageously refer these timing events to different times within a period of rotation of the disk 10. For example, it may be advantageous to use one reference time per rotation of the disk 10, rather than one per sector 12. Or the reference time may be mid-sector rather than during the spoke 14.

T1 and T2 indicate the start and end respectively of a spoke 14 T3 indicate[the end of a re-sync field RSF, which in the illustrated embodiment is the same as the combined spoke preamble 24 and spoke sync 25. The re-sync field RSF is used to re-synchronize a split data transfer. At T5, near the end of a sector frame, the EW subtimer 64 is started in anticipation of an upcoming spoke 14. The writing of a data block 16 is not begun after T5. At st1, a signal called EW2 is asserted which is used by the SPL 58 to determine the byte number at which to split a data block 16. As shown, the signal EW2 is de-asserted at time T1. At st2, which is the end of the sector frame, the BTC 68 suspends counting; it resumes at the following T3.

A split data block 16 nominally stops at st2, and may not extend past st3, which is the time that writing is disabled to protect the DC erase area 23 in the upcoming spoke 14. The DC erase area 23 can therefore be thought of as a non-data obstruction whose presence necessitates splitting. For split data blocks, the block transfer (either read or write) must be suspended before time st3. The timing event st1 must sufficiently precede st3 to account for synchronization delays and timing uncertainty between the STG 48 and SSM 50. Note that while in the illustrated embodiment, st3 corresponds to the beginning of the DC erase area 23, in other embodiments it may correspond to other obstructions that may not be over-written Returning now to FIG. 4, the SSM 50 is responsible for synchronizing to the spokes 14 and generating strobe signals to sample the servo bursts 28. If there has been no head switch since the last spoke 14, the SSM 50 is started by the STG 48 at time T1, which is at the nominal beginning of the preamble 30 of the next spoke 14. If there has been an intervening head switch, the SSM 50 instead enters a "sync-up" mode where it looks for the DC erase area 23 of the next spoke 14. In either case, the SSM 50 then relies on conventional sync detector 56 to detect when spoke sync has been found, and in turn indicates spoke sync to the STC 62. This indication resets the STC 62 to zero to start a new sector frame. After synchronizing, the SSM 50 waits until the appropriate time to assert the servo sampling strobes and then returns to an idle state until the beginning of the next spoke 14.

The BTC 68 like the STC 62 is a conventional binary counter clocked by the DC crystal clock. The BTC 68 wraps upon reaching a predetermined count detected by comparators 70; this count determines the duration of the block frame 22. The BTC 68 doesn't advance its count during the interval between T2 and T3 for split blocks, because the re-sync field RSF takes up extra time not required for non-split blocks. Also, the BTC 68 does not re-start if its count terminates after T5 in a sector so that no new block frames 22 are started before the upcoming spoke 14.

The BTG 52 must be re-programmed upon a band switch. This programming must establish, for all of the timing events shown in FIG. 5, values that are appropriate for the destination band. Such re-programming is preferably done during a seek so that data transfer can begin as soon as possible when the head reaches the destination band.

The BSM 54 controls data transfer between the AC chip 36 and the DC chip 38 during reads and writes of data blocks 16. The BSM 54 is clocked by a byte clock which is synchronous with the data clock on the clock wire 46 from the AC chip 36, and whose period is equal to the duration of one byte time in the data stream.

Figure 6:
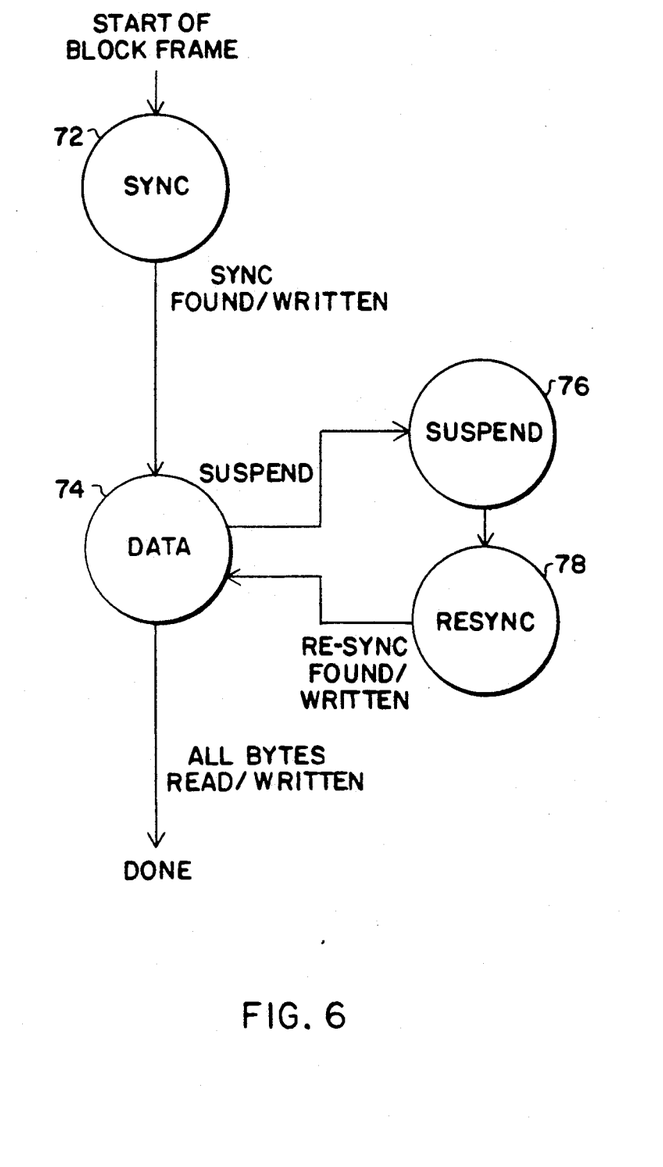
FIG. 6 is a state diagram of a data block state machine within the controller chip of FIG. 4.

The state flow of the BSM 54 is shown in FIG. 6. It consists of the illustrated states SYNC 72, DATA 74, SUSPEND 76, and RESYNC 78. For either reads or writes, the BSM 54 is started by the BTG 52 at the start of a block frame 22. During reads, the BSM 54 waits in the SYNC state 72 for the sync detector 56 to detect the block sync pattern 31, and then transitions to the DATA state 74. During the DATA state 74, the BSM 54 is accepting serial bytes of a disk data block 16 from the AC chip 36. If the data block 16 is not split, the BSM 54 stays in the DATA state 74 until all the bytes in the data block 16 have been transferred, and is then done until the next block frame 22.

If the data block 16 is split, a SUSPEND signal directs the BSM 54 to the SUSPEND state 76, where it waits until T2. The SUSPEND signal is generated by means which are described with reference to FIG. 7 below. Data transfer is suspended when the BSM 54 is in the SUSPEND state 76. At time T2, the BSM 54 enters the RESYNC state 78 where it again waits for the sync detector 56 to detect the re-sync field RSF before resuming the data transfer. When re-sync occurs, the BSM 54 returns to the DATA state 74 to finish the read.

The sequencing of the BSM 54 during writes is similar to that during reads, except that in the SYNC and RESYNC states 72 and 78 it merely waits a number of clock periods while the block sync pattern 31 or re-sync field RSF is being written, rather than waiting for sync or re-sync to be found.

Figure 7:
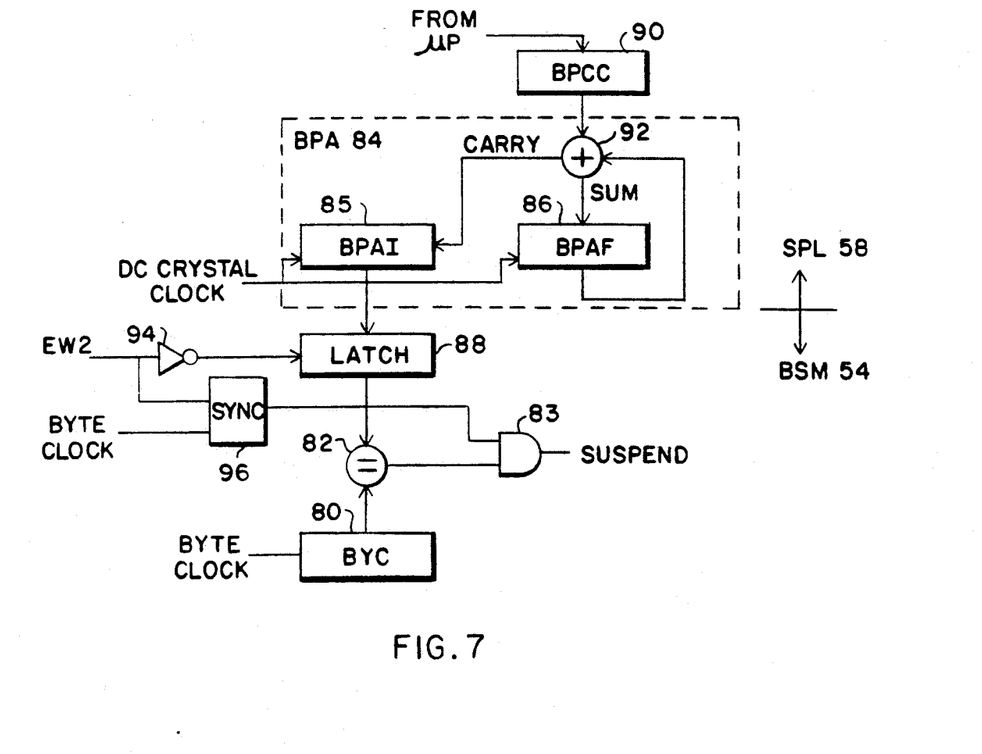
FIG. 7 is a block diagram of a byte position accumulator and associated logic in the controller chip of FIG. 4.

FIG. 7 is a block diagram showing the SPL 58 and a portion of the BSM 54 of FIG. 4 in greater detail. The BSM 54 employs a byte counter or BYC 80 to determine how long to stay in the DATA state 74 of FIG. 6. The BYC 80 is a conventional binary counter having a maximum count equal to the number of bytes per data block 16. The BYC 80 indicates when it has reached its maximum count; this indication terminates the DATA state 74 of the BSM 54. The byte count from the BYC 80 is fed to a comparator 82 whose output is used by AND gate 83 to generate the SUSPEND signal used by the BSM 54 to split blocks. It should be noted that the clock to the BYC 80 is stopped while the data transfer is suspended during the SUSPEND and RESYNC states.

The SPL 58 has a byte position accumulator or BPA 84 comprising an integer part BPAI 85 and a fractional part BPAF 86. It also has a latch 88, BPCC register 90, adder 92, inverter 94, and synchronizer 96. The 13-bit BPCC register 90, which is programmed by the microprocessor 47 of FIG. 3, holds a scale factor which indicates the nominal number of bytes per DC crystal clock period. This scale factor is different for each band 20, because the nominal data rate is different for each band 20; therefore the BPCC register 90 must be re-programmed whenever a band switch or head switch occurs. The actual number of bytes per DC crystal clock period varies, of course, because disk speed variation causes the actual data rate to deviate from the nominal data rate.

The nominal number of bytes per DC crystal clock period is obtained by dividing the DC crystal clock period by the nominal byte clock period for the current band. For example, if the nominal byte clock period is 108 ns. and the DC crystal clock period is 50 ns., their ratio is 0.46296. In this case, the 13 most significant bits of the binary equivalent of 0.46296 would be stored in the BPCC register 90.

The number of bits in the BPCC register determines the fractional precision of the scale factor, which in turn affects the accuracy of the accumulation process. In the illustrated embodiment the BPA 84 is accurate to one byte out of a possible several thousand in the data block 16; therefore 13 bits suffice in the BPCC register 90. Other embodiments may require more or less accumulation accuracy, and have correspondingly precise scale factors.

The BPA 84 continually identifies by position a byte within the data block 16 that will be transferred shortly; it does this by repetitively accumulating the value in the BPCC register 90. Every DC crystal clock cycle during the data transfer, the contents of the BPCC register 90 and the BPAF 86 are added together by adder 92. The sum is stored back in the BPAF 86, and the carry signal, if asserted, increments the BPAI 85. Therefore, the BPA 84 effectively counts at the nominal byte transfer rate.

Because the BPA 84 counts by the scale factor stored in the BPCC register 90 they provide means for scalingly counting cycles of the DC crystal clock to track the data transfer. By "scalingly counting" it is meant the combination of counting clock periods and scaling to account for the ratio of crystal clock period to byte clock period. Such scaled counting could be achieved in other ways, for example by using a binary counter to count cycles and a multiplier to multiply the cycle count by the scale factor. However, an accumulator such as the BPA 84 is simpler and smaller than a multiplier, and is therefore preferred.

While in the illustrated embodiment, the scale factor has only a fractional part, it may also have an integer part in other embodiments. This of course implies that the ratio of the periods of the DC crystal clock and the byte clock is greater than one. In fact, there may be several bytes per DC crystal clock period. It should be noted however that the scale factor determine the granularity of splitting the data blocks 16; the technique may lose effectiveness if large scale factors are used. Looking the other way, logic circuitry is minimized if the scale factor is not unnecessarily small or represented too precisely.

The BPA 84 is started shortly before the nominal beginning of the data field 32 in the data transfer, so that it is guaranteed to lead the data transfer. In other words, the value in the latch 88 must be greater than or equal to the value in the BYC 80 when the output from synchronizer 96 is first asserted. The time that the BPA 84 starts should take into account spin speed variation (which affects the relative starting times of a block frame 22 and a data block 16) and synchronization delays between the SPL 58 and the BSM 54. The actual starting time cf the BPA 84 within the block frame 22 is programmable by the microprocessor 47 of FIG. 3.

While signal EW2 is de-asserted, the value of the BPAI 85 is continually transferred to the latch 88. The latched value in turn is continually compared with the contents of the BYC 80 by comparator 82. When the signal EW2 is asserted (between the times st1 and T1, as shown in FIG. 5), the latch 88 is closed. The value in the closed latch 88 is the position of the last byte within the data block 16 that is to be transferred before suspending the data transfer. The synchronizer 96 synchronizes the signal EW2 to the byte clock. The synchronizer 96 may be constructed in a conventional manner from dual-ranked flip flops. The output of the synchronizer 96 indicates that the latched value is valid and represents the position of the last byte to be transferred; when asserted, it allows the output of the comparator 82 to generate the SUSPEND signal via AND gate 83. When the BYC 80 reaches the same value as that of the latch 88, the SUSPEND signal is asserted to force the BSM 54 to suspend data transfer for the duration of the spoke 14.

It should be noted that the means for designating the last byte to be transferred may differ from that described above. At time st1, the contents of the BPAI 85 could be stored in any of a variety of ways until the count in the BYC 80 reaches the same value. For example, the latch 88 could be replaced by a FIFO buffer, RAM memory, or other writable memory device. Alternatively, the BPAI 85 itself could be used if suitable control logic were added to enable and disable accumulation. Furthermore, alternative means for indicating that the stored value is the identity of the designated last byte to be transferred may be used. The BSM 54 needs to be directed to suspend data block transfer at the correct byte.

While the illustrated embodiment uses a byte (commonly 8 bits long) as its basic data unit, the principles of the invention are equally applicable to embodiments using other sub-block data units. For example, it may be advantageous for coding purposes to employ 7- or 9-bit bytes, or alternatively to use 16- or 32-bit words instead of bytes. There may also be other departures from the description falling within the scope of the invention as defined in the following claims.

What is claimed is:

1. A method of splitting a data block on a disk, comprising the steps of:
    establishing a predetermined time within a period of rotation of said disk by which the transfer of said data block must be suspended;
    generating during the transfer of said data block, a series of addresses of data units in said data block, each address being generated no more than a predetermined interval before the data unit having that address is transferred;
    designating at a time preceding said predetermined time by said predetermined interval the most recently generated address to be the address of the last data unit to be transferred before suspending the transfer of said data block;
    suspending the transfer of said data block when the designated last data unit has been transferred; and
    resuming the transfer of said data block after said predetermined time at the data unit following said designated last data unit.

2. A method as set forth in claim 1, wherein each of said data units is a byte.

3. A method as set forth in claim 1, wherein said predetermined time is established with respect to when synchronization to a spoke preceding said data block on said disk was achieved.

4. A method as set forth in claim 1, wherein said predetermined time is the time that a DC erase area on said disk begins to pass under a magnetic head used to transfer said data block.

5. A method as set forth in claim 1, wherein said period of rotation is in the range of 8 to 16 milliseconds.

6. A method as set forth in claim 1, wherein said generating step further comprises the step of scalingly counting cycles of a clock using a scale factor equal to the ratio of the period of said clock to the nominal transfer time of one data unit of said data block.

7. A method as set forth in claim 6, wherein said clock is a crystal clock.

8. A method as set forth in claim 6, wherein said scalingly counting step further comprises the step of accumulating said scale factor once per cycle of said clock.

9. A method as set forth in claim 1, wherein said designating step is performed at a time referenced to the time that synchronization to a spoke preceding said data block on said disk was achieved.

10. A method as set forth in claim 1, wherein said designating step further comprises the steps of:
    latching the most recently generated address; and
    indicating that the latched value is the address of the last data unit to be transferred.

11. A method as set forth in claim 1, further comprising the step of comparing the identity of said designated last data unit with a count of data units transferred to determine when said designated last data unit has been transferred.

12. A method as set forth in claim 1, wherein the transfer of said data block is controlled by a block state machine, and wherein said suspending step further comprises the step of changing the state of said block state machine to a state wherein the transfer of said data block is stopped.

13. A method of splitting a data block on a disk, comprising the steps of:
    establishing a predetermined time within a period of rotation of said disk by which the transfer of said data block must be suspended;
    accumulating once per cycle of a crystal clock a scale factor equal to the ratio of the period of said crystal clock to the nominal transfer time of one byte of said data block to generate a series of byte addresses, each address being generated no more than a predetermined interval before the byte having that address is transferred;
    latching a time preceding said predetermined time by said predetermined interval the byte address most recently generated in said accumulating step;
    indicating that the latched value is the address of the last byte to be transferred before suspending the transfer of said data block;
    comparing the latched value with a count of bytes transferred;
    suspending the transfer of said data block after said indicating step when said count of bytes transferred equals the latched value; and
    resuming the transfer of said data block after said predetermined time at the byte following said designated last byte.

14. A disk controller to split a data block on a disk, comprising:
    a timer to establish a predetermined time within a period of rotation of said disk by which the transfer of said data block must be suspended;
    means of generating during the transfer of said data block a series of addresses of data units in said data block, each address being generated no more than a predetermined interval before the data unit having that address is transferred;
    means for designating at a time preceding said predetermined time by said predetermined interval the most recently-generated address as the address of the last data unit to be transferred before suspending the transfer of said data block;
    means for suspending the transfer of said data block when the designated last data unit has been transferred; and
    means for resuming the transfer of said data block after said predetermined time at the data unit following said designated last data unit.

15. A disk controller as set forth in claim 14, wherein each of said data units is a byte.

16. A disk controller as set forth in claim 14, wherein said generating means comprises:

a register to hold a scale factor equal to the ratio of the period of a clock to the nominal transfer time of one data unit of said data block; and an accumulator to accumulate said scale factor once per cycle of said clock during the transfer of said data block.

17. A disk controller as set forth in claim 14, wherein said designating means comprises:

a latch to be loaded at a time preceding said predetermined time by said predetermined interval with the most recently generated address; and means for indicating that the value in said latch is the address of the designated last data unit.

18. A disk controller as set forth in claim 14, further comprising a comparator to indicate when a count of data units of said data block that have been transferred matches the address of the designated last data unit.

19. A disk controller as set forth in claim 14, further comprising a block state machine to control the transfer of said data block, and wherein said suspending means comprises means for changing the state of said block state machine to a state wherein the transfer of said data block is stopped.

20. A disk controller to split a data block on a disk, comprising:

a timer to establish a predetermined time within a period of rotation of said disk by which the transfer of said data block must be suspended;

a register to provide a scale factor equal to the ratio of the period of a clock to the nominal transfer time of one data unit of said data block;

an accumulator coupled to said register to accumulate said scale factor once per cycle of said clock during the transfer of said data block to generate a series of addresses of data units in said data block, each address being generated no more than a predetermined interval before the data unit having that address is transferred;

a latch coupled to said accumulator to be loaded therefrom at a time preceding said predetermined time by said predetermined interval and to designate the address most recently generated thereby as the address of the last data unit to be transferred before suspending the transfer of said data block;

a counter to hold a count of transferred data units of said data block;

a comparator to indicate when said count of transferred data units matches the value in said latch;

means for indicating when the value in said latch is the address of the designated last data unit;

means for suspending the transfer of said data block when said comparator indicates a match and the value in said latch is the identity of the designated last data unit; and means for resuming the transfer of said data block after said predetermined time at the data unit following said designated last data unit.

* * * * *